(12) United States Patent
Blömeling et al.

(10) Patent No.: US 6,619,724 B2
(45) Date of Patent: Sep. 16, 2003

(54) MOTOR VEHICLE DOOR COMPRISING AN INSULATING ELEMENT

(75) Inventors: Heinz Blömeling, Leichlingen (DE); Christian Gnädig, Mechernich (DE); Martin Jenny, Feldkirch (AT)

(73) Assignee: Carcoustics Tech Center GmbH, Leverkusen (DE)

( * ) Notice: Subject to any disclaimer, the term of this patent is extended or adjusted under 35 U.S.C. 154(b) by 0 days.

(21) Appl. No.: 09/980,567

(22) PCT Filed: Apr. 3, 2001

(86) PCT No.: PCT/EP01/03767

§ 371 (c)(1),
(2), (4) Date: Jul. 1, 2002

(87) PCT Pub. No.: WO01/74623

PCT Pub. Date: Oct. 11, 2001

(65) Prior Publication Data

US 2002/0180236 A1 Dec. 5, 2002

(30) Foreign Application Priority Data

Apr. 4, 2000 (DE) .......................... 100 16 758

(51) Int. Cl.⁷ .................................................. B60J 5/04
(52) U.S. Cl. ............................... 296/146.5; 296/146.7; 296/39.1; 49/502
(58) Field of Search ..................... 296/146.1, 146.7, 296/146.9, 146.5, 39.1, 39.3; 49/502

(56) References Cited

U.S. PATENT DOCUMENTS

| | | | |
|---|---|---|---|
| 5,111,619 A | 5/1992 | Billin et al. | |
| 5,322,722 A * | 6/1994 | Rozenberg | 296/39.1 |
| 5,345,720 A | 9/1994 | Illbruck et al. | |
| 5,345,721 A * | 9/1994 | Stein et al. | 296/146.7 |
| 5,473,125 A | 12/1995 | Stief et al. | |
| 6,085,483 A * | 7/2000 | Kurosaki | 296/146.7 |
| 6,381,906 B1 * | 5/2002 | Pacella et al. | 49/502 |
| 6,409,250 B1 * | 6/2002 | Schultheiss | 296/146.7 |
| 6,412,852 B1 * | 7/2002 | Koa et al. | 296/146.7 |
| 6,422,640 B2 * | 7/2002 | Whitehead et al. | 296/146.7 |
| 6,474,721 B2 * | 11/2002 | Nishikawa et al. | 296/146.6 |

FOREIGN PATENT DOCUMENTS

| | | |
|---|---|---|
| DE | 3510018 | 1/1986 |
| DE | 3603518 | 8/1987 |
| DE | 4416972 | 11/1995 |
| DE | 19501292 | 7/1996 |
| DE | 19804781 | 8/1999 |
| FR | 2235612 | 1/1975 |

* cited by examiner

Primary Examiner—D. Glenn Dayoan
Assistant Examiner—Greg Blankenship
(74) Attorney, Agent, or Firm—Martin A. Farber

(57) ABSTRACT

Motor-vehicle door (1) comprising an outer wall (2) and an inner wall (3), a cladding part (4) mounted on the inner wall (3), and an insulation element (5) disposed between the inner wall (3) and the cladding part (4), the insulation element (5) being formed as a foam layer and being clamped in at its edge between the cladding part (4) and the inner wall (3) in a clamping region (K), wherein the insulation element (5) is secured in an adhesive-free manner between the cladding part (4) and the inner wall (3) in the clamping region (K), forming a positively locking profiling.

21 Claims, 4 Drawing Sheets

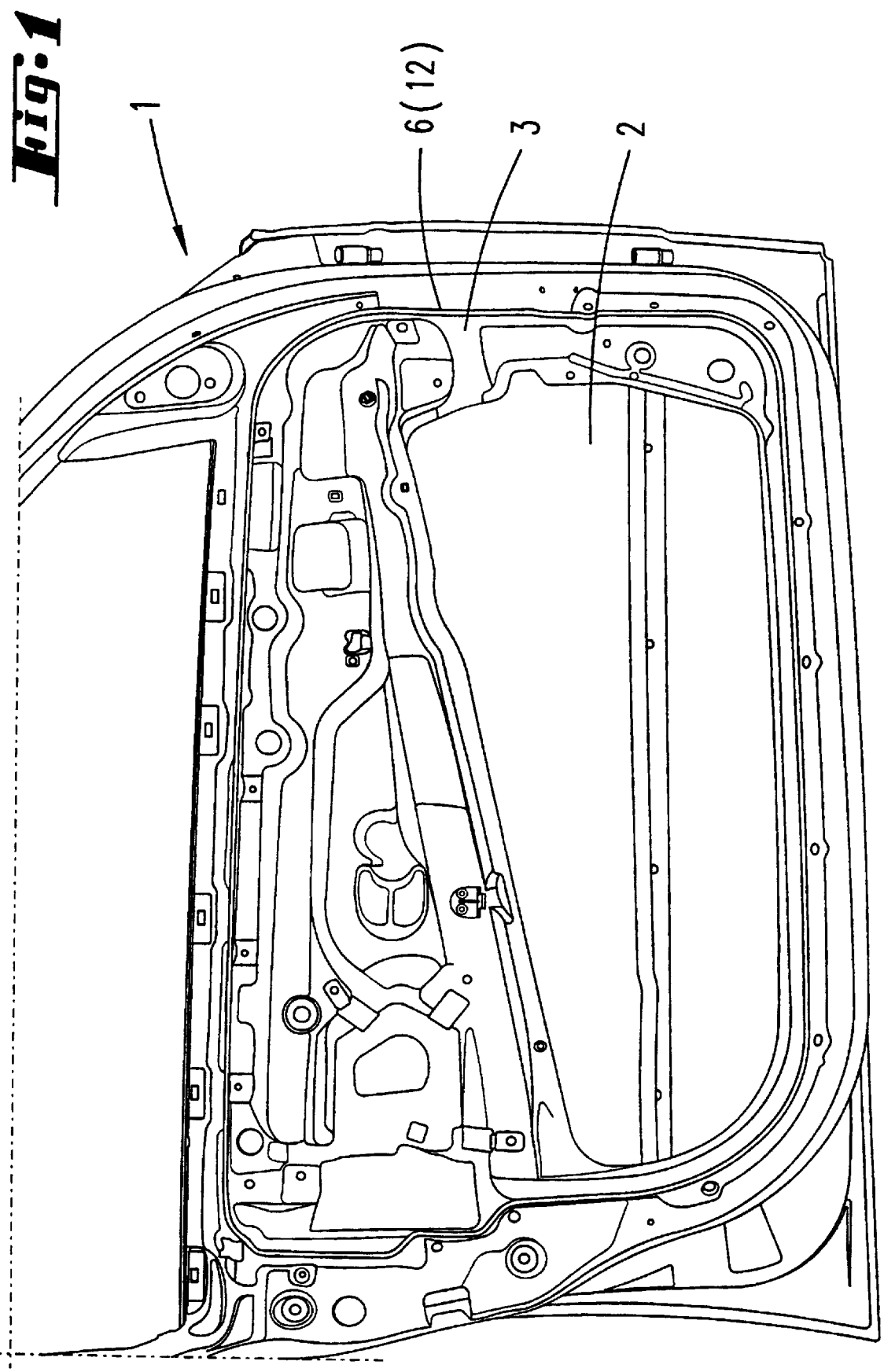

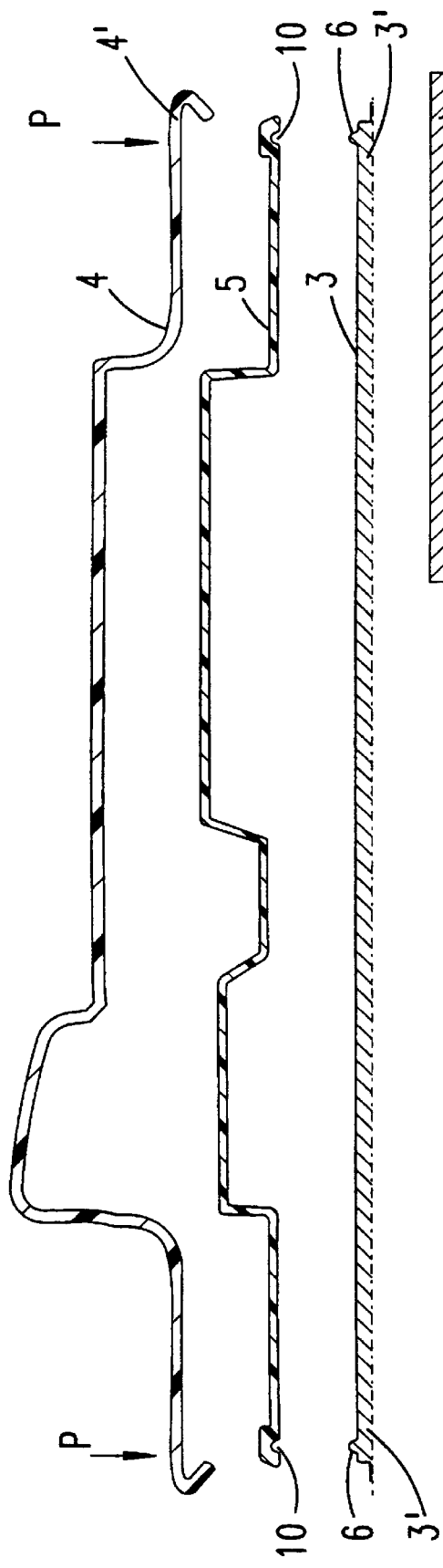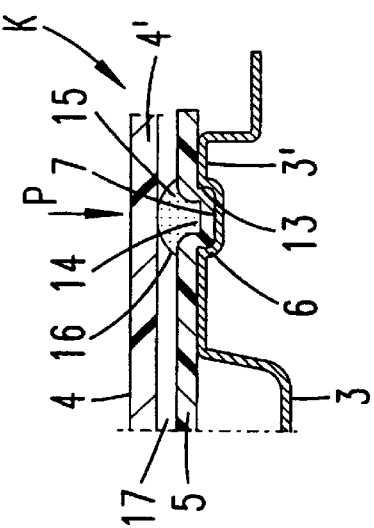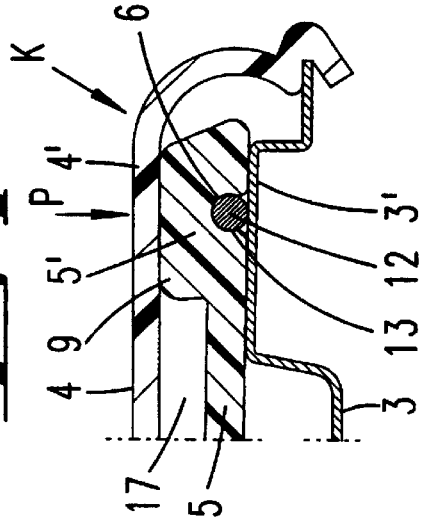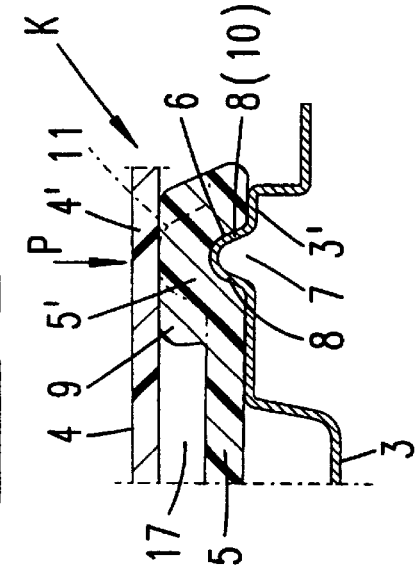

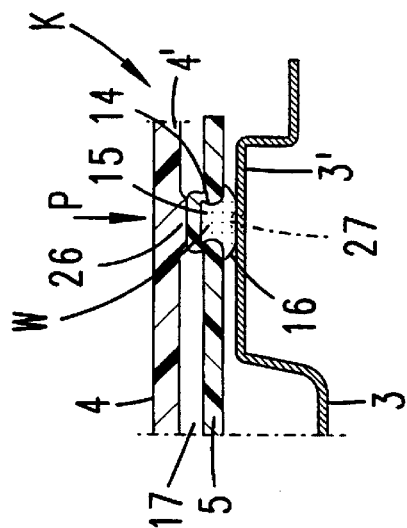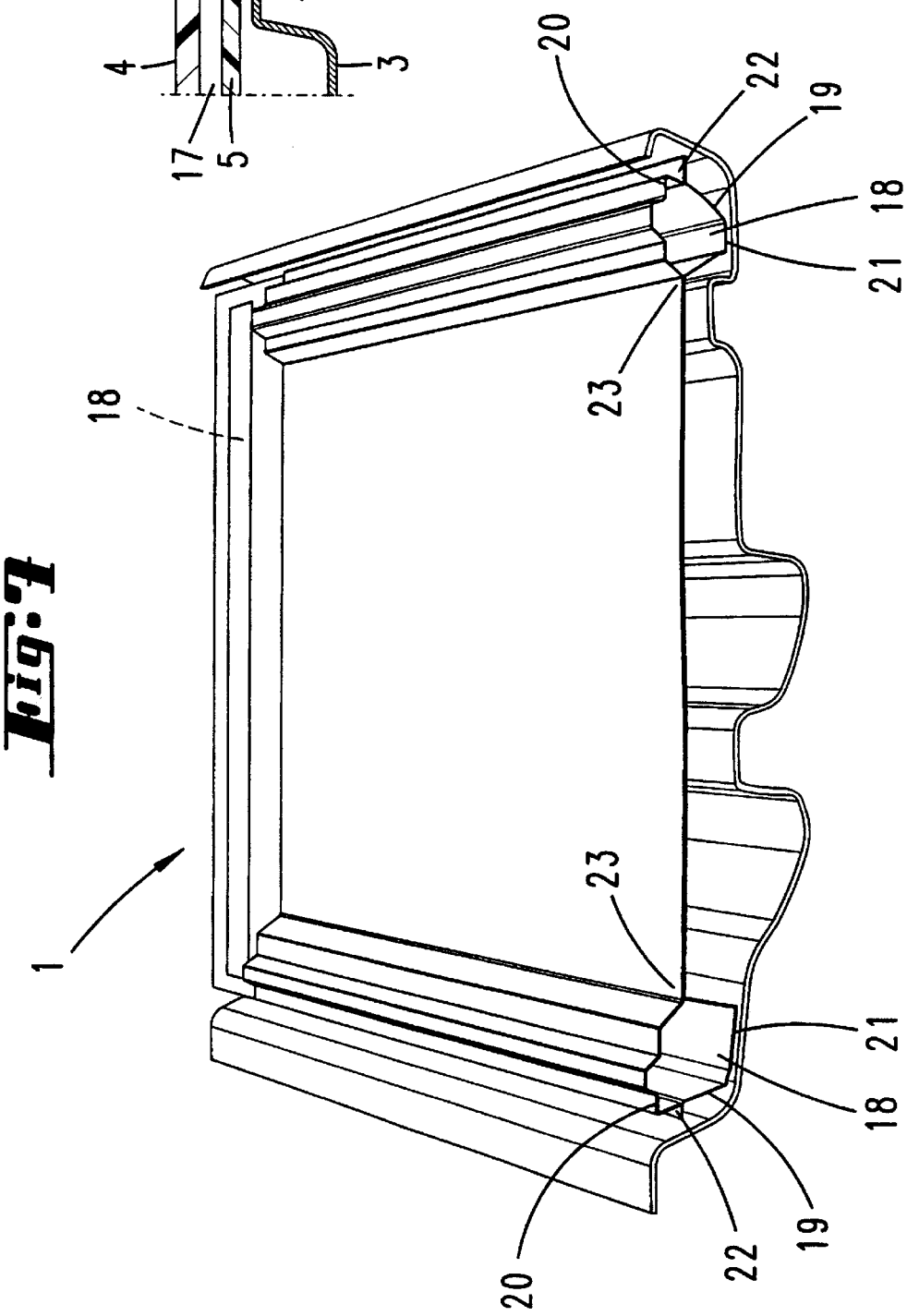

MOTOR VEHICLE DOOR COMPRISING AN INSULATING ELEMENT

FIELD AND BACKGROUND OF THE INVENTION

The invention relates to a motor-vehicle door having an outer wall and an inner wall, a cladding part mounted on the inner wall, and an insulation element disposed between the inner wall and the cladding part, the insulation element being formed as a foam layer and being clamped in at its edge between the cladding part and the inner wall in a clamping region.

A motor-vehicle door with an insulation element incorporated in this manner can be gathered, for example, from DE 198 04 781 A1.

A film-laminated foam layer being clamped in as an insulation element can be gathered from DE 35 10 018 C2. Also applied in the edge region, producing a connection in this way, is a self-adhesive layer.

It is also known for the insulation element to be secured via a butyl-rubber bead. This proves to involve high production outlay and there is a risk of this sealing-action means of attachment "bleeding".

SUMMARY OF THE INVENTION

It is an object of the invention for the insulation element to be secured in a reliable manner on the body of the door by more straightforward means.

This object is achieved with a motor-vehicle door, wherein the insulation element is secured in an adhesive-free manner between the cladding part and the inner wall in the clamping region, a positively locking profiling being formed in the process.

Such a configuration achieves a simplified, but nevertheless effective, interconnection between the parts which are to be secured to one another. The use of a positively locking profiling between the cladding part and the inner wall aids the clamping action. Flanks leaving the general layer plane have a displacement-blocking action, so that it is possible to dispense with adhesive bonding altogether. It is advantageous, in addition, for the positively locking profiling to correspond to a positively locking embossed edge portion of the inner wall. These means may be provided for at the same time as the sheet metal of the inner wall is embossed. In specific terms, the positively locking embossed edge portion is pre-curved in the direction of the cladding part. Alternatively, in order to achieve such exposed parts, it is further proposed that the positively locking embossed edge portion is pre-curved in the direction of the outer wall. This embossed edge portion leaving the general layer plane, by way of clamping, also has a displacement-blocking action. The parts may even be preassembled to this extent during production. A solution which is particularly advantageous in this respect consists in that the positively locking embossed edge portion has at least one undercut. This increases the mechanical grip between the two parts without use having to be made at this early stage of the clamping, which, following corresponding preassembly, only takes effect during final production of the motor-vehicle door. If use has been made up until now of, as it were, dedicated means for realizing the positively locking profiling, then a solution which uses an additional component consists in that (in the sense of forming transversely projecting flanks) the positively locking embossed edge portion is formed by a wire fitted all the way round the inner wall. This solid embossed edge portion may be welded to the inner wall. In the case of the wire having a round cross-section, moreover, there is the advantage of undercuts on the semicircular zone used for securing the same. It is further proposed that the insulation element is pre-embossed in order to shape it to correspond to the positively locking embossed portion of the inner wall. This gives, for all practical purposes, means for a self-centring male/female plug connection between the two parts. It is further provided that a groove created by the insulation element being pre-embossed is filled with a foam bead. The latter is a bead made of in-situ foam. The top of this bead can be used as an exposed section for the clamping. It is further favourable for the top of the foam bead to be curved convexly in the transverse direction. A configuration of even independent importance then consists in that the insulation element has a sealing bead which encloses an air cushion running all the way round the edge. This is a type of tubular chamber. Less material is required. The enclosed air cushion can be compressed with self-distributing action with a high capacity for a close fit. It proves to be favourable in production terms for the insulation element to be formed in a number of layers, at least at its edge, and for the air cushion to be enclosed between the welded layers. Of course, it is also possible here to apply the principle of positively locking profiling between the cladding part and the inner wall.

The invention then relates to an insulation element for disposing on motor-vehicle doors having an outer wall and an inner wall, and a cladding part mounted on the inner wall, the insulation element being disposed between the inner wall and the cladding part, and the insulation element also being formed as a foam layer and being clamped in at its edge between the cladding part and the inner wall in a clamping region, and, in order to achieve a structurally advantageous solution, the invention proposes that, in adaptation to a positively locking embossed edge portion in the direction of the cladding part, the insulation element has a groove which is created by pre-embossing and is filled with a foam bead. The insulation element, furthermore, is formed such that the groove has at least one undercut flank, allowing latching-like preassembly on mating means of the inner wall. Finally, it is favourable here for the top of the foam bead to be curved convexly in the transverse direction, this in order to achieve the more advantageous clamping action explained.

The invention also relates to a motor-vehicle door having an outer wall and an inner wall, a cladding part mounted on the inner wall, and an insulation element disposed between the inner wall and the cladding part, the insulation element being formed as a foam layer and being clamped in at its edge between the cladding part and the inner wall in a clamping region, and, in order to achieve a likewise advantageous solution, the invention proposes that, by means of a flexible body attached to a surface-area extent of the insulation element, the insulation element is secured in an adhesive-free manner between the cladding part and the inner wall in the clamping region, with the flexible body being compressed in the process. The flexible body butts directly against the inner wall. In conjunction with the clamping action, this flexible body has a surprisingly layer-braking property. The layers are secured in position to an exceptional extent. Moreover, it is provided that the flexible body is a foam bead. The invention further proposes that the flexible body is disposed such that it runs all the way round the edge. This can extend as far as a sealing termination, in particular if a skin-forming entry of the cells is intended. Use is made of PUR foam. The flexible body is a foam bead which is foamed onto the insulation element. It is advantageous in terms of arrangement here for the insulation element to have a groove into which the foamed-on foam projects such that it is anchored by a foot. This produces advantageous positive locking between these parts. It is also possible to utilize an introduction channel for foaming the foam into place. Finally, the invention proposes that the inner wall is formed with a smooth surface in the region of the flexible body. To conclude, it also proves to be beneficial in clamping terms if, directed towards the flexible body, the cladding part has a bead-like thickening. An exposed rib which acts in this manner in the rear of the flexible body functions as an effective holding-down means, so that the foam bead, which is usually curved transversely, is compressed in a defined position.

BRIEF DESCRIPTION OF THE DRAWINGS

The subject matter of the invention is explained in more detail hereinbelow with reference to an exemplary embodiment illustrated in the drawings, in which:

FIG. 1 shows a side view of a motor-vehicle door, with the cladding part omitted, FIG. 2 shows, schematized to the greatest extent, a horizontal section through the motor-vehicle door in an exploded illustration and with the outer wall omitted, positively locking profiling means being represented, FIG. 3 shows, on a larger scale than FIG. 2 and with the connection made, the clamping region of this positively locking profiling, FIG. 4 shows the clamping region in a variant of the positively locking profiling, FIG. 5 shows the clamping region of a further variant of the positively locking profiling, FIG. 7 shows, likewise in perspective illustration, the motor-vehicle door, the insulation element having an air cushion running all the way round its edge as a sealing bead, and FIG. 8 shows a final variant of the clamping region in an illustration like that, for example, of FIG. 5.

DETAILED DESCRIPTION OF THE PREFERRED EMBODIMENT

Figure 6:
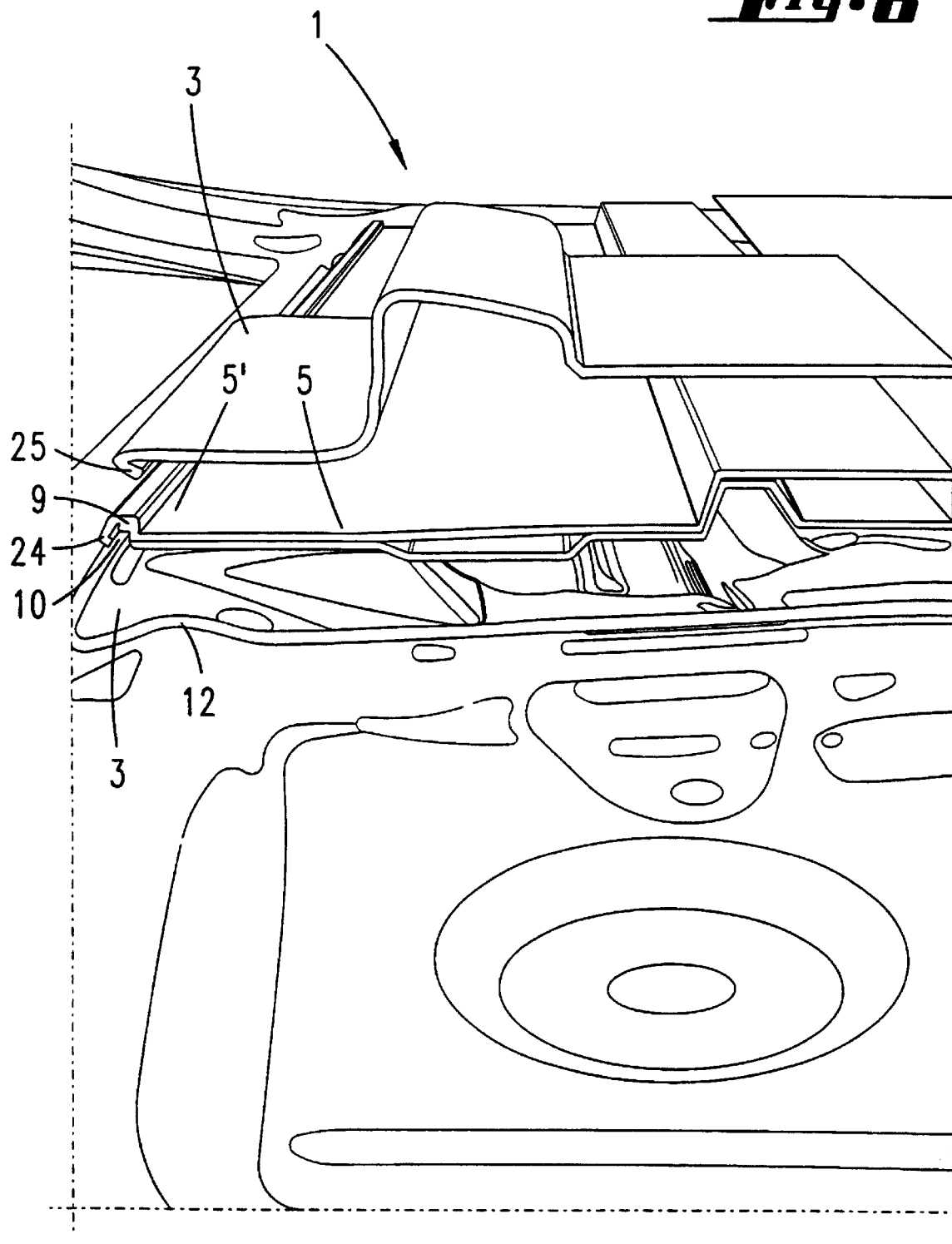
FIG. 6 shows, in perspective illustration, a detail of the motor-vehicle door using the positively locking profiling according to FIG. 4.

The motor-vehicle door 1 illustrated is made up of a plurality of main constituent parts. From the outside to the inside, these are an outer wall 2 and an inner wall 3. These preferably consist of sheet metal and have a type-specific structure.

Adapted in this way, furthermore, a cladding part 4 is provided on the inside of the passenger compartment. The cladding part usually consists of plastics with a textile or similar covering located on the side which can be seen.

Finally, an insulation element 5 is located between the inner wall 3 and the cladding part 4.

The insulation element 5 consists of a foam layer. This is preferably closed-cell material (40–50 kg/M$^3$). The outlines of the inner wall 3, the cladding part 4 and the insulation element 5 are such that a common connecting zone can be realized around the periphery; this is because the insulation element 5 is clamped in at its edge between the inner wall 3 and the cladding part 4. The clamping region in this respect is designated K throughout.

Rigid parts forming clamping jaws here are constituted by an edge region 3' of the inner wall 3 and an edge region 4' of the cladding part 4. The clamping force P acts transversely to the general plane illustrated in which the above-described main constituent parts of the motor-vehicle door 1 extend. Beyond the actual clamping action, arrow P arises as an arresting factor with a blocking-action component in a direction transverse to the direction of the clamping force.

This is realized in specific terms in that the elastic insulation element 5 is secured between the cladding part 4 and the inner wall 3 in the clamping region K, a positively locking profiling being formed in the process. This securing is adhesive-free. A high level of sealing is provided at the same time.

The positively locking profiling corresponds to a positively locking embossed edge portion 6 of the inner wall 3. You are referred to FIG. 3. The positively locking embossed edge portion 6 there is formed by channel 7 which is to be provided for at the same time as the sheet metal is embossed and is to be carried out from the outside of the vehicle door 1. The channel 7 is configured such that it runs all the way round without interruption.

The positively locking embossed edge portion 6 precurved in the direction of the cladding part 4 forms a bead-like rib with a peak which is rounded convexly in the transverse direction and with downwardly sloping flanks 8. The height of the resulting rib-like embossed edge portion 6 corresponds substantially to the clear width at the entry to the channel 7.

The clamped-in edge part 5' of the insulation element 5 may already have the mating contour of the positively locking embossed edge portion 6. A correspondingly shaped pre-embossed portion can be gathered from FIG. 2.

The outer part 5' is illustrated in thickened form. The thickening can be achieved by providing a strip which forms a bead 9. It is also conceivable, however, for the insulation element 5 to be configured throughout with the thickness of the bead 9. The groove-forming pre-embossed portion is designated 10. Its flank profile, likewise converging in the direction of the groove base, corresponds to that of the flanks 8. This results in centring covering of the inner wall 3.

For an increase in the clamping action, it may also be advantageous, in specific cases, for the positively locking embossed edge portion 6 to form or impress the groove itself by corresponding penetration into the bead 9.

A third possible configuration in this respect consists in the protuberance 11 illustrated by chain-dotted lines in FIG. 3, the thickness region which can be seen on the left being maintained throughout.

The variant represented in FIG. 4 is basically of the same construction. The reference numerals are used analogously, in some cases without being repeated in the text. It can be gathered here that the positively locking embossed edge portion 6 is formed by a wire 12 fitted all the way round the inner wall 3. The wire is welded thereon. It is of circular cross-section. It is also possible here for the corresponding insulation element 5 to be pre-embossed to shape it to correspond to the cross-sectionally circular positively locking embossed portion of the inner wall 3. The tapering running from the equator to the inner wall 3 produces an undercut. This allows advantageous fitting together in the form of preassembly of the parts 3, 5. The undercut is designated 13. Anchoring rear engagement would also be provided, however, in the case of the groove being formed by impression, in that the resulting edge sits closely to the contour on the foot side, that is to say on the side where the wire 12 is secured.

The bead 9 discussed is also illustrated in the variant according to FIG. 4.

Let us now look at the variant according to FIG. 5: here too, the basic principle of the positively locking embossed edge portion 6 according to FIG. 3 is maintained, the only difference being that the positively locking embossed edge portion 6 in this case is pre-curved in the direction of the outer wall 2. Accordingly, the channel 7 is located on that side of the inner wall 3 which is directed towards the insulation element 5. It can be gathered that the undercut 13 explained above is also used in this solution. The flanks 8 form the undercut mating surfaces of the insulation element 5. The undercut 13 of this positively locking embossed edge portion 6 is of relatively low height. Of course, a deeper channel may be provided. In this variant, the foam layer of the insulation element 5 is of substantially uniform thickness, the layer protuberance projecting into the channel being compressed, to be precise approximately to half the initial thickness of the foam layer.

The protuberance in the direction of the outer wall 2 in order to create the positively locking embossed edge portion 6 there leaves behind a groove 14 in the rear of the embossed edge portion 6. This groove 14, which may also be produced by the insulation element 5 being pre-embossed, is filled. Foam is used as the filler here. The resulting foam bead is designated 15. The foam may be in-situ foam. This is joined intimately to the region of the groove 14 and the flanks thereof as well as extremities in the form of rounded groove edges, the sought-after sealing action being maintained.

As may further be gathered from FIG. 5, the top 16 of the foam bead 15 is curved convexly in the transverse direction over the entire width. The clamping region K is thus also provided there, as in the case of the solutions described above, with a compressible protrusion. The clamping can be applied intensively utilizing the gap dimension of the clearance 17, at least in the vicinity of the edge, between the cladding part 4 and the insulation element 5. At least partial abutment may be provided in the centre.

FIG. 7 illustrates an insulation element 5 in the case of which the flexibility or elasticity, providing the clamping action, for arresting the insulation element 5 at the edge is based not solely on the restoring force of the foam material, but also on the action or concomitant action of an air cushion 18. This air cushion 18, which runs all the way round the edge, is a type of tube. This functions as a sealing bead 19. It is likewise clamped in at its edge between the inner wall 3 and the cladding part 4 in the clamping region. The clamping region is also designated K here. The edge regions 3', 4' of the inner wall 3 and cladding part 4 may correspondingly have mounts corresponding more or less to the bead shape.

When use is made of a closed-cell positively locking layer, the air channels may also be produced by injection of a blowing agent. Otherwise, the configuration is based on a number of layers, such that the air cushion 18 is enclosed between two layers 20, 21 which are to be connected.

The layers are welded together. The connecting locations are designated 22 and 23 in the drawing of FIG. 7.

In an advantageous development, it is possible to vary the compressibility of the sealing bead 19, for example by a gel filling (not illustrated)

The clamping securing means may be in the form of a peripheral connection, by hooks and mating hooks, as can be gathered, for example, from FIGS. 2 and 6.

FIG. 6 also shows the formation of the edge part 5' of the insulation element 5 with a snap-action bead 9, having the pre-embossed portion 10 allowing the wire 12 to enter. The edge itself is realized as a snap-action hook 24. This, in turn, has a snap-action hook 25 engaging over it, the hook 25 being formed on the inner wall 3.

According to the variant of FIG. 8, a compressible flexible body W which provides braking action replaces a positively locking profiling between the inner wall 3 and the insulation element 5. The flexible body is a bead made of PUR foam. To illustrate it physically, the designation 15 is used in addition, relating to the foam bead discussed in the basic version.

In the illustrated peripheral clamping region K of the motor-vehicle door 1, the flexible body W is seated on that side of the insulation element 5 which is directed towards the inner wall 3, and is fixed thereon. Attachment thereto is of a thermal nature.

By producing or applying the clamping force in the manner described above, the flexible body W is compressed. It thus acts, for all practical purposes, to brake/block displacement forces arising horizontally and/or in the door plane (comparable, for example, to an eraser). This makes it possible, here too, to provide the sought-after adhesive-free securing between the layers and/or elements.

The flexible body W or foam bead 15 butts against the inner wall 3 by way of its curved surface, designated as top 16 throughout. The latter is formed with a smooth surface in the region of the flexible body W.

In this variant too, the flexible body W is arranged such that it runs all the way round, i.e. at a spacing from the edge, as is also the case with the positively locking elements described in relation to the basic version.

The flexible-body bead in the form of the foam bead 15 is provided by foaming onto the insulation element 5.

According to the version of FIG. 8, the insulation element 5 also has a groove 14, although this one opens in mirror-inverted orientation in relation to the version according to FIG. 5. Accordingly, the groove or its opening is directed towards the inner wall 3.

This configuration provides an advantageous cavity for fixing the flexible body W, in that the foamed-on foam bead 15 is incorporated in the groove such that it is anchored by a foot. As can be gathered, the groove 14 is also slightly undercut in this case, this producing at least a better adhering surface on the groove flanks, as far as the rounded extremities of these flanks.

In order to achieve transmission of the clamping-pressure action to the flexible body, the cladding part 4 has a thickening 26. This is directed towards the rear of the flexible body W. It acts directly against the bottom of the base of that zone of the groove 14 which extends out in the direction of the cladding part 4. The bead-like thickening, which is approximately trapezoidal in cross-section, produces a controlled pressure-exerting action in conjunction with the clamping force applied there.

As can be gathered from the illustration of FIG. 8, it is also possible for a pressed-out portion 27 of the inner wall 3 to expose in the direction of the flexible body, this giving the effect of the latter being retained with clamping action between two jaws, which has the effect of preventing the insulation element clamped in between from slipping.

We claim:

1. Motor-vehicle door (1) comprising an outer wall (2) and an inner wall (3), a cladding part (4) mounted on the inner wall (3), and an insulation element (5) disposed between the inner wall (3) and the cladding part (4), the insulation element (5) being formed as a foam layer and being clamped in at its edge between the cladding part (4) and the inner wall (3) in a clamping region (K), wherein the insulation element (5) is secured in an adhesive-free manner between the cladding part (4) and the inner wall (3) in the clamping region (K), forming a positively locking profiling.

2. Motor-vehicle door according to claim 1, wherein the positively locking profiling corresponds to a positively locking embossed edge portion (6) of the inner wall (3).

3. Motor-vehicle door according to claim 2, wherein the positively locking embossed edge portion (6) is pre-curved in a direction of the cladding part (4).

4. Motor-vehicle door according to claim 2, wherein the positively locked embossed edge portion (6) is pre-curved in a direction of the outer wall (2).

5. Motor-vehicle door according to claim 2, wherein the positively locking embossed edge portion (6) has at least one undercut (13).

6. Motor-vehicle door according to claim 2, wherein the positively locking embossed edge portion (6) is formed by a wire (12) fitted all around the inner wall (3).

7. Motor-vehicle door according to claim 2, wherein the insulation element (5) is pre-embossed shaped corresponding to the positively locking embossed edge portion (6) of the inner wall (3).

8. Motor-vehicle door according to claim 1, further comprising a foam bead (15) which fills a groove (14) formed by the insulation element (5) being pre-embossed.

9. Motor-vehicle door according to claim 8, wherein a top (16) of the foam bead (15) is curved convexly in transverse direction.

10. Motor-vehicle door according to claim 1, wherein the insulation element (5) has a sealing bead (19) which encloses an air cushion (18) running all around the edge.

11. Motor-vehicle door according to claim 10, wherein the insulation element (5) is formed in a number of layers, at least at the edge, and the air cushion (18) is enclosed between welded layers (20, 21).

12. Insulation element (5) for disposing on a motor-vehicle door (1) comprising an outer wall (2) and an inner wall (3), a cladding part (4) mounted on the inner wall (3), and the insulation element (5) being disposed between the inner wall (3) and the cladding part (4), the insulation element (5) being farmed as a foam layer and being clamped in at its edge between the cladding part (4) and the inner wall (3) in a clamping region (K), there being a positively locking embossed edge portion (6) in direction of the cladding part (4), wherein the insulation element (5) has a groove (14) which is formed by pre-embossing and filled with a foam bead (15).

13. Insulation element according to claim 12, wherein the groove (14) has at least one undercut flank.

14. Insulation element according to claim 12, wherein a top (16) of the foam bead (15) is curved convexly in transverse direction.

15. Motor-vehicle door (1) comprising an outer wall (2) and an inner wall (3), a cladding part (4) mounted on the inner wall (3), and an insulation element (5) disposed between the inner wall (3) and the cladding part (4), the insulation element (5) being formed as a foam layer and being clamped in at its edge between the cladding part (4) and the inner wall (3) in a clamping region (K), wherein by a flexible body (W) attached to a surface-area extent of the insulation element (5), the insulation element (5) is secured in an adhesive-free manner between the cladding part (4) and the inner wall (3) in the clamping region (K), wherein the flexible body (W) is compressed during securement.

16. Motor-vehicle door according to claim 15, wherein the flexible body (W) is disposed running around the edge.

17. Motor-vehicle door according to claim 15, wherein the flexible body (W) is a foam bead (15).

18. Motor-vehicle door according to claim 15, wherein the flexible body (W) is a foam bead (15) which is foamed onto the insulation element (5).

19. Motor-vehicle door according to claim 18, wherein the insulation element (5) has a groove (14) into which the foamed-on foam bead (15) projects such that it is anchored by a foot.

20. Motor-vehicle door according to claim 15, wherein the inner wall (3) is formed with a smooth surface in a region of the flexible body (W).

21. Motor-vehicle door according to claim 15, wherein directed towards the flexible body (w), the cladding part (4) has a bead-like thickening (26).

* * * * *